United States Patent [19]
Matsunaga et al.

[11] Patent Number: 6,153,917
[45] Date of Patent: Nov. 28, 2000

[54] SEMICONDUCTOR ACCELERATION SENSOR AND MANUFACTURING METHOD THEREOF

[75] Inventors: Tadao Matsunaga; Takashi Kunimi; Masahiro Nezu; Masatomo Mori, all of Tokyo; Masayoshi Esashi, 1-11-9 Yagima-minami, Taihaku-ku, Sendai-shi, Miyagi, all of Japan

[73] Assignees: Akebono Brake Industry Co., Ltd., Tokyo; Masayoshi Esashi, Sendai, both of Japan

[21] Appl. No.: 09/270,659

[22] Filed: Mar. 16, 1999

[30] Foreign Application Priority Data

Mar. 16, 1998 [JP] Japan .................................. 10-065694

[51] Int. Cl.[7] .................................................. H01L 21/283
[52] U.S. Cl. .............................. 257/419; 216/2; 73/517; 360/280
[58] Field of Search ....................... 216/2, 33; 73/514.32, 73/517; 257/419; 360/280, 283.1, 283.3

[56] References Cited

U.S. PATENT DOCUMENTS

| | | | |
|---|---|---|---|
| 3,634,727 | 1/1972 | Polye | 317/231 |
| 4,996,627 | 2/1991 | Zias et al. | 361/283 |
| 5,095,750 | 3/1992 | Suzuki et al. | 73/517 |
| 5,343,064 | 8/1994 | Spangler et al. | 257/350 |
| 5,367,429 | 11/1994 | Tsuchitani et al. | 361/280 |
| 5,392,651 | 2/1995 | Suzuki et al. | 73/517 |
| 5,616,844 | 4/1997 | Suzuki et al. | 73/514.32 |
| 5,676,851 | 10/1997 | Suzuki et al. | 216/2 |

FOREIGN PATENT DOCUMENTS

| | | |
|---|---|---|
| 41 33 897 A1 | 4/1993 | Germany . |
| 6-82474 | 3/1994 | Japan . |
| 0 8279444 | 10/1996 | Japan . |

Primary Examiner—Donald L. Monin, Jr.
Attorney, Agent, or Firm—Morgan, Lewis & Bockius LLP

[57] ABSTRACT

A semiconductor acceleration sensor including a central board having a movable electrode section, an outside board having a stationary electrode section, and a sealing insulating section for joining the central board and the outside board which are laminated on each other, wherein the sealing insulating section has a conductive layer, and the conductive layer is a sealing member or an anodic bonding electrode.

7 Claims, 7 Drawing Sheets

SEMICONDUCTOR ACCELERATION SENSOR AND MANUFACTURING METHOD THEREOF

BACKGROUND OF THE INVENTION

The present invention relates to a semiconductor sensor and a manufacturing method thereof. More particularly, the present invention relates to a semiconductor sensor, the sealing insulating section of which is characteristic, and also the present invention relates to a manufacturing method thereof.

There has been a conventionally known semiconductor acceleration sensor in which a central board and an outside board are laminated on each other so that they are formed into a laminated body, and the central board is subjected to etching as disclosed in Japanese Unexamined Patent Publication No. Hei. 6-82474.

As shown in FIG. 8, the semiconductor sensor includes a central board 1', outside boards 2' and a sealing section 3'. Further, the central board 1' includes a movable electrode section 11'. On the other hand, the outside board 2' includes a stationary electrode section 21'. Furthermore, voltage is impressed upon between the movable electrode section 11' and the stationary electrode section 21' from an external circuit not shown in the drawing. Due to the above arrangement, when the movable electrode section 11' is given a force and displaced by the action of acceleration, an electrostatic capacity between the movable electrode section 11' and the stationary electrode section 21' is changed, and this change in the electrostatic capacity is detected by an external circuit. Therefore, the acceleration can be measured.

The semiconductor acceleration sensor is advantageous as follows. In the case of the semiconductor acceleration sensor, when the thickness of a sheet of Pyrex glass 3' is made thick, that is, when the thickness of a sheet of Pyrex glass 3' is made to be 5 to 10 $\mu$m, the electrostatic capacity between the boards 15', 25', which are opposed to each other via the sheet of Pyrex glass 3', can be sufficiently reduced compared with the electrostatic capacity between the movable electrode section 11' and the stationary electrode section 21'. Therefore, sensitivity of the acceleration sensor can be enhanced. However, there are several points to be improved in the above semiconductor acceleration sensor. That is, in order to make the thickness of the sheet of Pyrex glass 3' to be 5 to 10 $\mu$m by means of vapor deposition of spattering, it takes a very long time, for example, it takes 5 to 10 hours.

Further, in the above acceleration sensor, although it is possible to reduce the electrostatic capacity between the boards 1' and 25', it is impossible to completely avoid an influence of this electrostatic capacity. Furthermore, due to the difference between the thermal expansion coefficient of silicone (Si) board and that of sealing glass, there is caused a problem in which the temperature characteristic is deteriorated.

Furthermore, the following problems may be encountered. When anode junction is conducted in the process of manufacturing, it is necessary to impress voltage between both Si boards 1' and 2'. Due to an electrostatic attraction force of the impressed voltage, the movable electrode section 11' is drawn and deformed. Accordingly, there is a possibility that both electrode sections 11' and 21' are short-circuited. Therefore, it is difficult to apply a higher voltage. Accordingly, it is difficult to conduct anodic bonding.

Furthermore, in the conventional acceleration sensor, no consideration is given to electromagnetic noise. Especially, when electromagnetic noise is given from the outside of the acceleration sensor, it is impossible to prevent its influence.

SUMMARY OF THE INVENTION

The present invention has been accomplished to solve the above problems. The present invention provides a semiconductor sensor characterized in that: it is possible to obtain a high acceleration detecting sensitivity; the temperature characteristic is excellent; the acceleration is not affected by electromagnetic noise; and it is possible to conduct a highly reliable anodic bonding. Also, the present invention provides a method of manufacturing the semiconductor acceleration sensor.

The present invention provides a semiconductor acceleration sensor comprising: a central board having a movable electrode section; an outside board having a stationary electrode section; and a sealing insulating section for joining the central board and the outside board which are laminated on each other, wherein the sealing insulating section has a conductive layer.

Also, the present invention provides a semiconductor acceleration sensor in which the conductive layer is a shielding member.

Also, the present invention provides a semiconductor acceleration sensor in which the conductive layer is an anodic bonding electrode.

Also, the present invention provides a semiconductor acceleration sensor in which the conductive layer is a spatter film.

Also, the present invention provides a method of manufacturing a semiconductor acceleration sensor which comprises a central board having a movable electrode section, an outside board having a stationary electrode section and a sealing insulating section having a conductive layer wherein the central board, outside board and sealing insulating section are laminated and joined on each other, the method characterized in that: the conductive layer is an anodic bonding electrode when the central board and the sealing insulating section are subjected to anodic bonding.

Also, the present invention provides a method of manufacturing a semiconductor acceleration sensor characterized in that electric potential of the central board is the same as that of the outside board.

DESCRIPTION OF THE PREFERRED EMBODIMENTS

An embodiment of the present invention will be explained below.

Figure 5A:
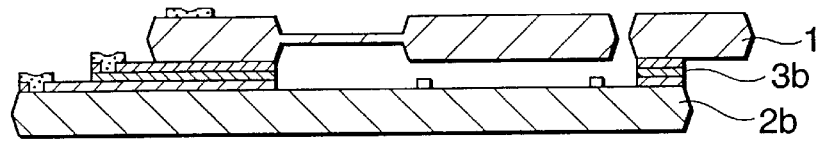
FIGS. 5A–C are schematic illustrations of the assembling process of the semiconductor acceleration sensor of Embodiment 1.
Figure 5B:
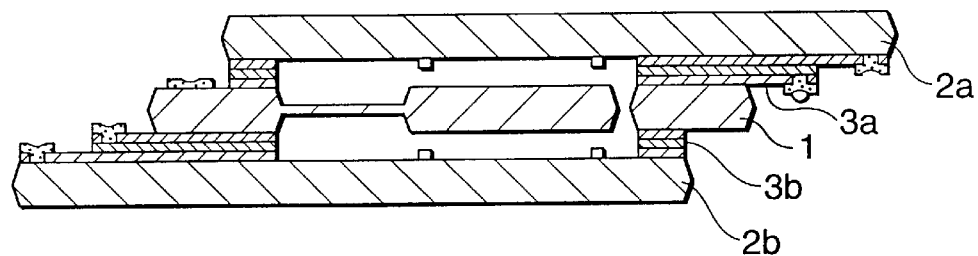
Figure 5C:
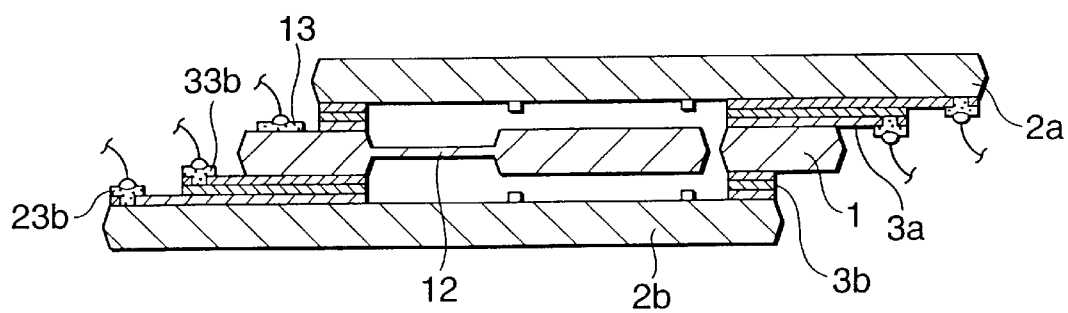
Figure 6A:
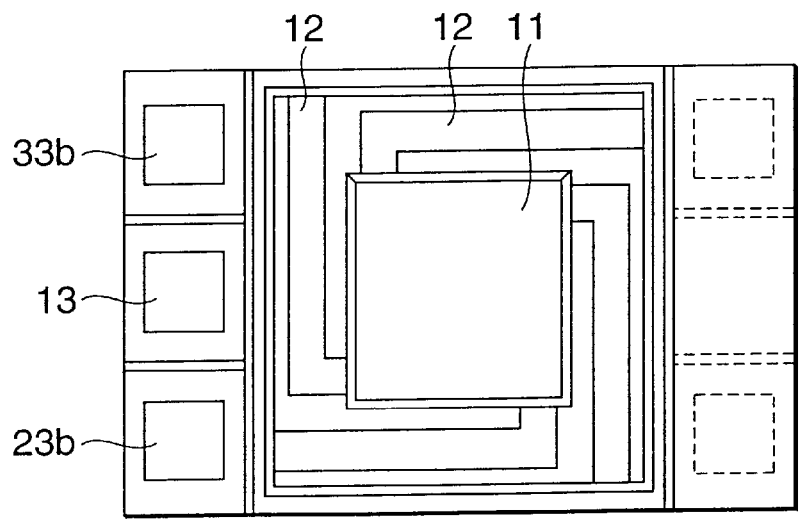
FIGS. 6A and B are a schematic illustrations of a semiconductor acceleration sensor of Embodiment 2.
Figure 6B:
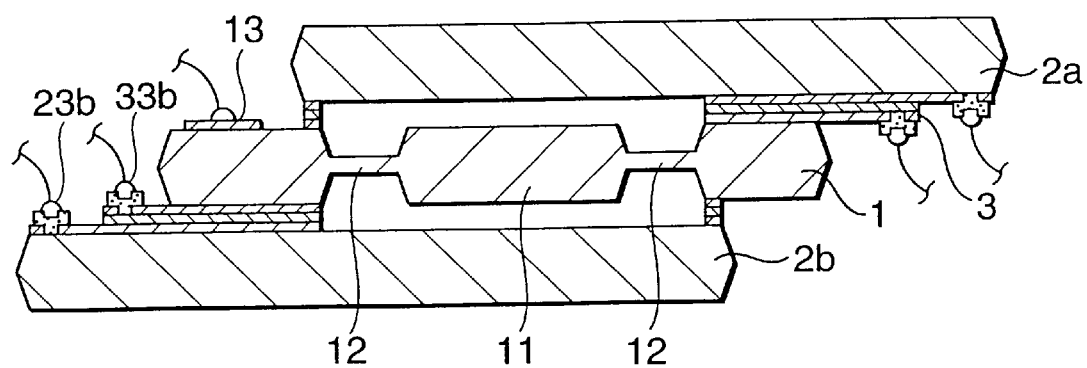
Figure 7:
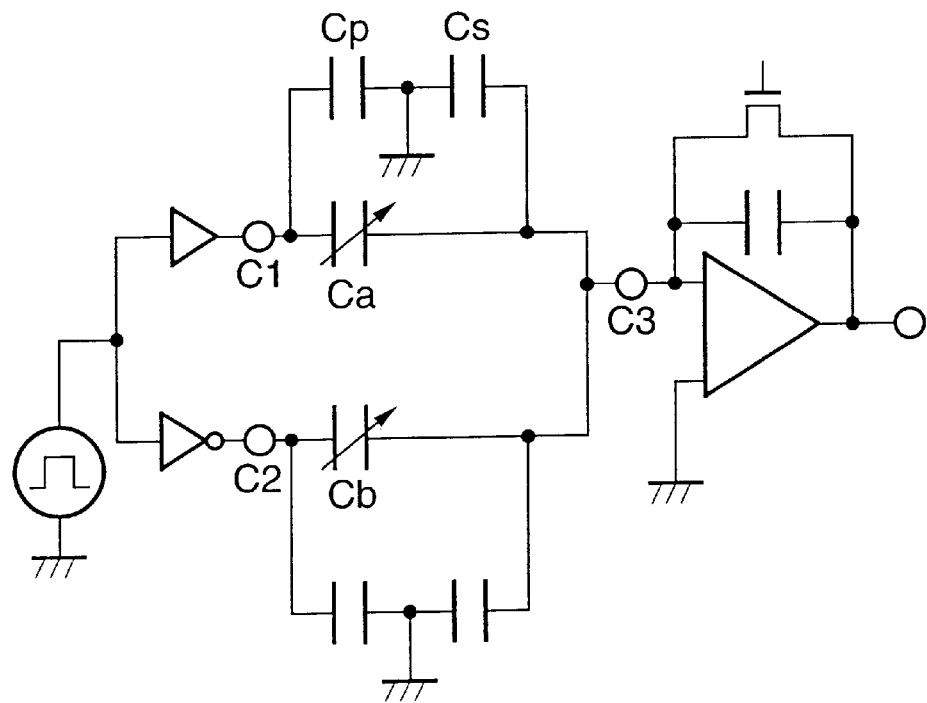
FIG. 7 is a schematic illustration of a measurement circuit of a semiconductor acceleration sensor of the embodiment.
Figure 8:
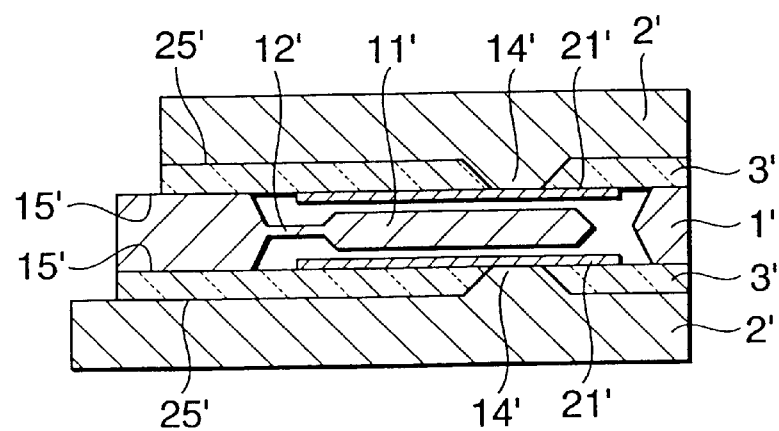
FIG. 8 is a schematic illustration of a semiconductor acceleration sensor of a conventional example.

Referring to FIGS. 1 to 7, a semiconductor acceleration sensor of the present invention and a method of manufacturing the semiconductor acceleration sensor will be explained as follows. FIG. 1 is a schematic illustration of a semiconductor acceleration sensor of Embodiment 1. FIG. 2 is a schematic illustration of a central board of the semiconductor acceleration sensor of Embodiment 1. FIG. 3 is a schematic illustration of the manufacturing processes (a) to (f) of an outside board of the semiconductor acceleration sensor of Embodiment 1. FIG. 4 is a schematic illustration of the manufacturing processes (g) to (m) of the outside board of the semiconductor acceleration sensor of Embodiment 1. FIG. 5 is a schematic illustration of the assembling process of the semiconductor acceleration sensor of Embodiment 1. FIG. 6 is a schematic illustration of a semiconductor acceleration sensor of Embodiment 2. FIG. 7 is a schematic illustration of a measurement circuit of a semiconductor acceleration sensor of the embodiment.

Figure 1A:
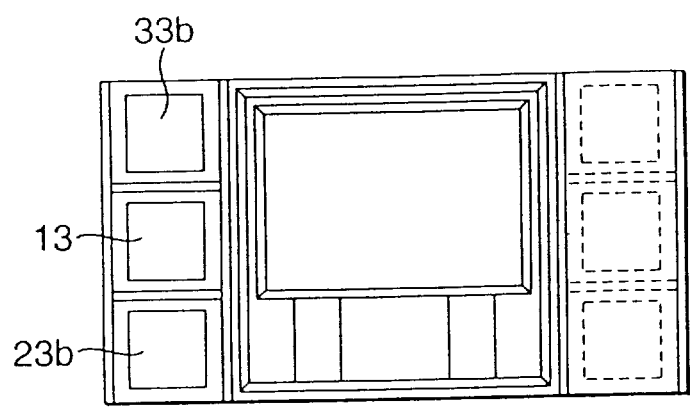
FIGS. 1A and B are schematic illustrations of a semiconductor acceleration sensor of Embodiment 1.
Figure 1B:
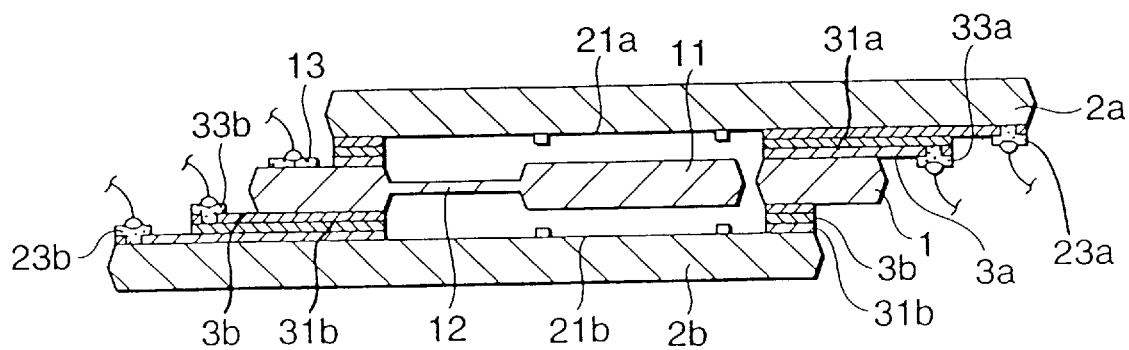

Embodiment 1 will be explained below. As shown in FIGS. 1(a) and 1(b), a semiconductor acceleration sensor of this embodiment is composed of a laminated body including a central board 1 and outside boards 2a, 2b. FIG. 1(a) is an upper view of the acceleration sensor of this embodiment, and FIG. 1(b) is a cross-sectional front view of the acceleration sensor of this embodiment. The central board 1 and the outside boards 2a, 2b are sealed by the sealing insulating sections 3a, 3b. For example, the central board 1 is made of Si and provided with a movable electrode 11, a movable electrode support section 12 and a central terminal section 13. For example, the outside boards 2a, 2b are made of Si and provided with stationary electrode sections 21a, 21b and outside terminal sections 23a, 23b. The sealing insulating sections 3a, 3b are respectively provided with conductor layers 31a, 31b. The conductor layers 31a, 31b are respectively connected with GND. Since the structure is symmetrical with respect to the vertical direction, it is possible to make the electrostatic capacity between the central board 1 and the outside board (first layer) 2a coincide with the electrostatic capacity between the central board 1 and the outside board (third layer) 2b. When the conductive layer 31 is connected with GND via the terminal section 33, it is possible to completely avoid an influence of the electrostatic capacity generated between the boards which are opposed to each other via the sealing insulating section 3. Therefore, it is possible to enhance the detection sensitivity of the acceleration sensor as high as possible.

Since the sealing insulating section 3 includes the conductive layer 31, the thickness of the sealing insulating section 3 forms a gap between the stationary electrode and the movable electrode. Consequently, it is unnecessary to conduct etching on the board made of silicon. For the above reasons, the dimensional accuracy of the gap is very high, and the characteristic of the acceleration sensor can be stabilized. Further, since the laminated body is composed of three layers of Si boards, it is possible to enhance the temperature characteristic.

In the semiconductor acceleration sensor, voltage is given between the movable electrode section 11 and the stationary electrode sections 21a, 21b from an outside circuit (not shown in the drawing) via the terminal sections 13, 23. When the movable electrode section 11 is displaced by a force generated by the influence of acceleration, an electrostatic capacity between the movable electrode section 11 and the stationary electrode section 21 is changed. When this change in the electrostatic capacity is detected by an outside circuit, the acceleration can be measured.

When the acceleration sensor is given electromagnetic noise from the outside, the electrostatic capacity is changed. Accordingly, it is impossible to measure an accurate value of acceleration. However, in the semiconductor acceleration sensor of this embodiment, the conductive layer 31 is formed in the sealing insulating section 3, and the conductive layer 31 is connected with GND so that it can be shielded. Due to the above structure, it is possible to reduce an influence of electromagnetic noise, so that no problems are caused in the practical use. Due to the existence of this conductive layer 31, the semiconductor acceleration sensor of this embodiment can provide the following advantages when it is compared with a semiconductor acceleration sensor of the prior art.

(1) It is possible to avoid an influence of the electrostatic capacity between the boards except for the electrostatic capacity between the stationary electrode and the movable electrode, without increasing a quantity of sealing glass, that is, without deteriorating the temperature characteristic. Therefore, it is possible to enhance the sensitivity of the acceleration sensor.

(2) It is possible to shield a semiconductor acceleration sensor from the outside and prevent an influence of electromagnetic noise give from the outside.

Referring to FIGS. 2 to 4, a method of manufacturing a semiconductor acceleration sensor of Embodiment 1 will be explained below.

Referring to FIGS. 2A–I, a process of manufacturing the central board will be explained as follows.

Figure 2A:
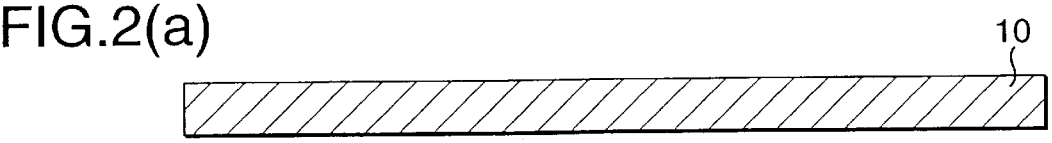
FIGS. 2A–I are schematic illustrations of a central board of the semiconductor acceleration sensor of Embodiment 1.

(1) There is prepared a board 10 made of Si containing P which will be used as a central board as shown in FIG. 2a.

Figure 2B:
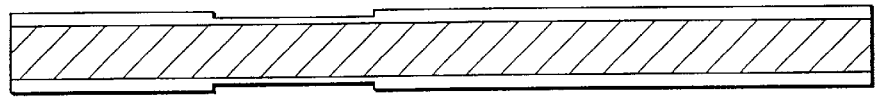

(2) This board is subjected to wet-oxidation of 1 $\mu$m and then subjected to lithography using resist, so that $SiO_2$ of 7000 Å is etched and the board is formed into a predetermined shape as shown in FIG. 2b.

Figure 2C:
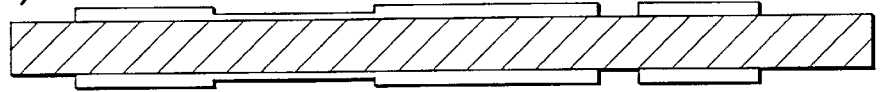

(3) Lithography is conducted using resist, and $SiO_2$ of 1 $\mu$m is etched as shown in FIG. 2c.

Figure 2D:
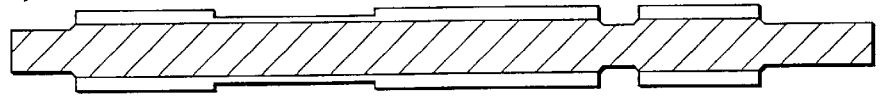

(4) Si of TMAH (tetramethyl ammonium hydroxide) is etched as shown in FIG. 2d.

Figure 2E:
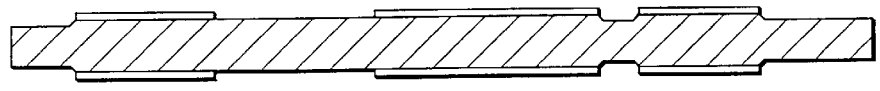

(5) $SiO_2$ of 3000Å is etched all over the surface as shown in FIG. 2e.

Figure 2F:
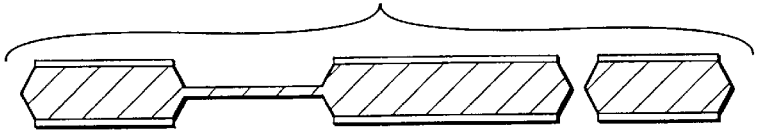

(6) Si of TMAH is etched through, so that a movable electrode section is formed as shown in FIG. 2f.

Figure 2G:
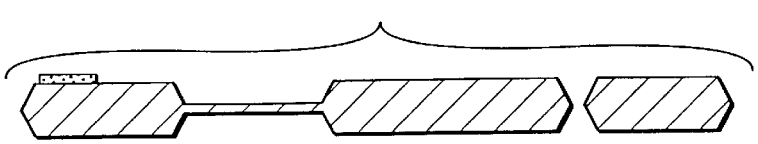

(7) $SiO_2$ is etched all over the surface, and a stencil mask of Al is vapor-deposited and Al sintering is conducted, so that a terminal section 13 is formed as shown in FIG. 2g.

Figure 2H:
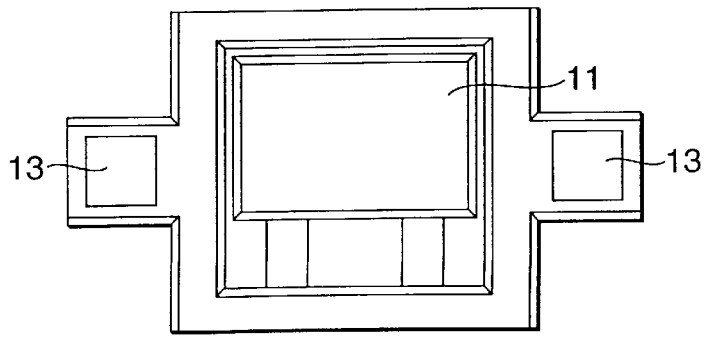
Figure 2I:
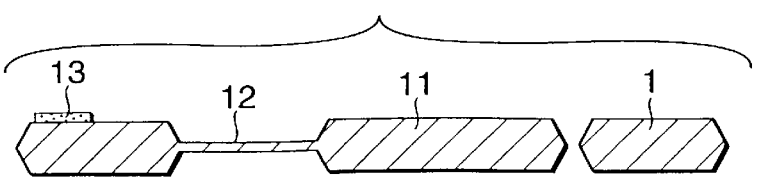

(8) There is formed a central board 1 having a movable electrode section 11, a movable electrode support section 12 and a central terminal section 13 as shown in FIGS. 2h and 2i.

Next, a process of manufacturing an outside board (third layer) 2b will be explained as shown in FIGS. 3A–F and 4A–G.

Figure 3A:
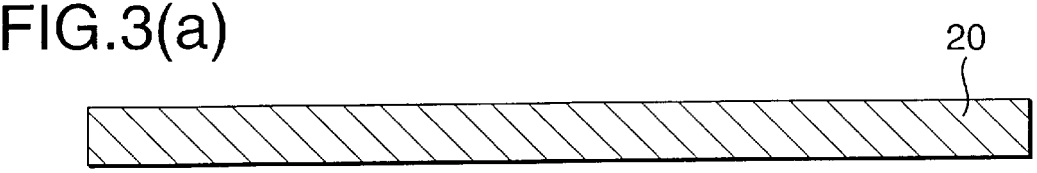
FIGS. 3A–F are schematic illustrations of the manufacturing processes of an outside board of the semiconductor acceleration sensor of Embodiment 1.

(1) There is prepared a board 20 made of Si containing P as shown in FIG. 3a.

Figure 3B:
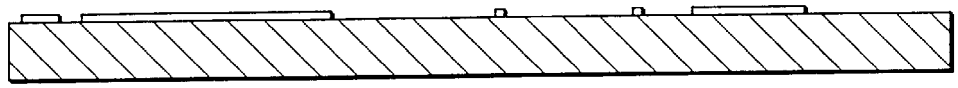

(2) Wet-oxidation is conducted, and then lithography is conducted using resist and $SiO_2$ is etched as shown in FIG. 3b.

Figure 3C:
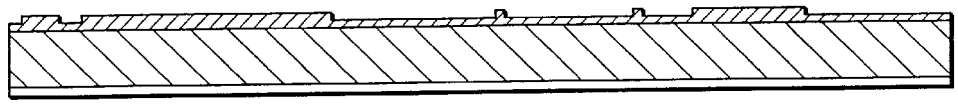

(3) Wet-oxidation is conducted as shown in FIG. 3c.

Figure 3D:
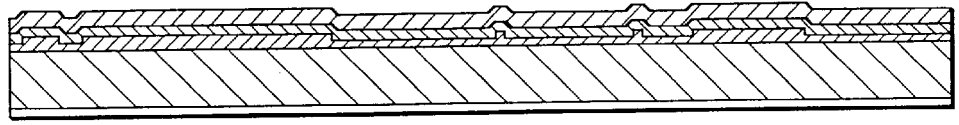

(4) Cr is spattered and then Pyrex glass is spattered as shown in FIG. 3d.

Figure 3E:
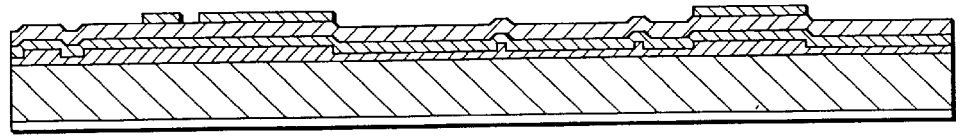

(5) Ni is spattered, and then lithography is conducted using resist and Ni is etched as shown in FIG. 3e.

Figure 3F:
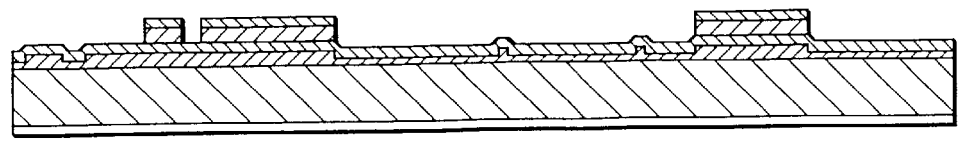

(6) Pyrex glass is etched as shown in FIG. 3f.

Figure 4A:
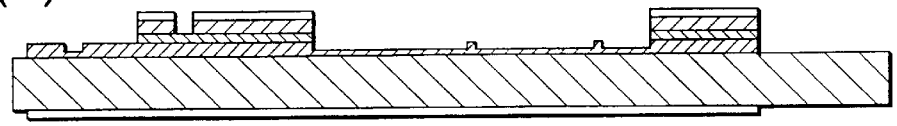
FIGS. 4A–G are schematic illustrations of the manufacturing processes of the outside board of the semiconductor acceleration sensor of Embodiment 1.

(7) Lithography is conducted using resist, and then Cr is etched as shown in FIG. 4A.

Figure 4B:
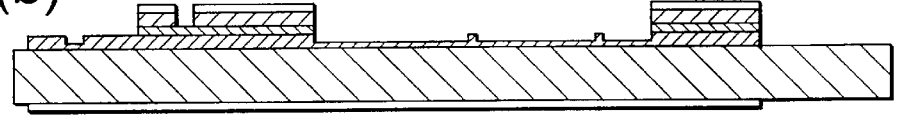

(8) Lithography is conducted using resist, and then $SiO_2$ is etched as shown in FIG. 4B.

Figure 4C:
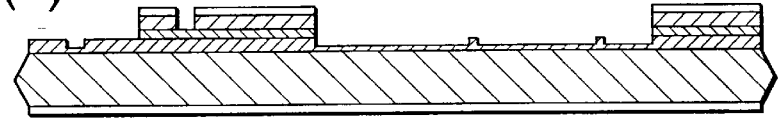
Figure 4D:
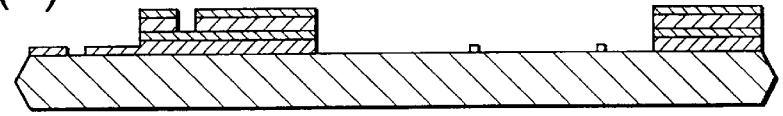

(9) Si is etched as shown in FIG. 4C.

(10) $SiO_2$ is etched all over the surface as shown in 4D.

Figure 4E:

(11) Ni is removed and Al is vapor-deposited using a mask and sintered, so that a terminal section is formed as shown in FIG. 4E.

Figure 4F:
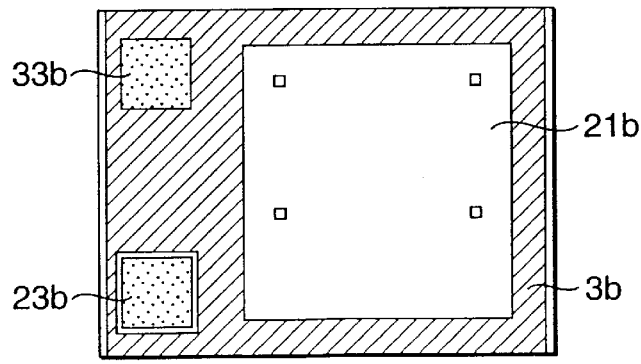
Figure 4G:
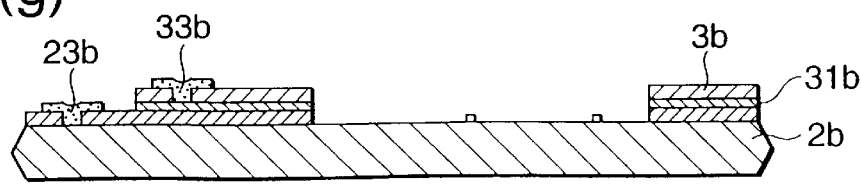

(12) There is formed an outside board (third layer) 2b having a stationary electrode section 21b, an outside terminal section 23b, a sealing section 3b and a conductive layer 31b as shown in FIGS. 4F and 4G.

In this connection, an outside electrode (first layer) 2a can be formed in the same manner as that of the outside board (third layer).

Next, an assembling process of assembling a semiconductor acceleration sensor will be explained referring to FIG. 5A–C.

(1) A central board 1 is laminated on the outside board (third layer) 2b and subjected to anodic bonding as shown in FIG. 5a.

(2) Further, an outside board (first layer) 2a is laminated and subjected to anodic bonding and dicing as shown in FIG. 5b.

(3) Wiring is conducted by means of wire-bonding. In this way, assembling is completed, and a semiconductor acceleration sensor can be obtained as shown in FIG. 5c.

A method of anodic-bonding will be explained below.

In this case, anode-bonding of the outside board (third layer) 2b and the central board 1 is explained.

On the outside board (third layer) 2b, there are provided $SiO_2$ layer 32, Cr layer which is a conductive layer 31, and a glass layer which is a sealing insulating layer 3. $SiO_2$ layer 32 is used for insulating the conductive layer 31 from the outside board 2b. When anodic bonding is conducted, the central board 1 is used as one electrode, and Cr layer 31 is used as the other anodic bonding electrode. When voltage is impressed while heat is given, it is possible to join the central board 1 to a joining surface of the glass layer 3. In this case, when electric potential of the outside board 2 is made to be the same as that of the central board 1, no electrostatic attraction force is given to the movable electrode section 11 by the outside board 2.

Embodiment 2 will be explained below. In this embodiment, the movable electrode is supported by the support section 12 at both end portions. Due to the above arrangement, the movable electrode section can be moved in the vertical direction in parallel. Therefore, a change in the electric capacity, which is caused by a displacement of the movable electrode section, can be kept linear to the acceleration given to the acceleration sensor.

Next, a method of measuring acceleration by the semiconductor acceleration sensor will be explained below.

FIG. 7 is a view showing a circuit for realizing a method of measuring acceleration by the semiconductor acceleration sensor.

When acceleration is measured by the semiconductor acceleration sensors of Embodiments 1 and 2, not only the electric capacities Ca and Cb between the movable electrode section 11 and the stationary electrode sections 21a, 21b but also other electric capacities must be considered. That is, it is necessary to consider electric capacity Cs of $SiO_2$ layer and electric capacity Cp of glass layer which are generated by the existence of $SiO_2$ layer 32 and glass layer. However, when the conductive layer is connected to GND, electric capacity Cs of $SiO_2$ layer and electric capacity Cp of glass layer can be eliminated. Due to the foregoing, as shown in FIG. 7, when a clock pulse is used and a sum of the output of a buffer and the output of an inverter is measured, acceleration can be measured according to changes of electric capacities Ca and Cb.

The present invention provides a semiconductor sensor characterized in that: it is possible to obtain a high acceleration detecting sensitivity; the temperature characteristic is excellent; the acceleration is not affected by electromagnetic noise; and it is possible to conduct a highly reliable anodic bonding. Also, the present invention provides a method of manufacturing the semiconductor acceleration sensor.

What is claimed is:

1. A semiconductor acceleration sensor comprising:

a central board having a movable electrode section;

an outside board having a stationary electrode section; and a sealing insulating section for joining the central board and the outside board which are laminated on each other, wherein the sealing insulating section has an insulating layer, a conductive layer on the insulating layer, and a sealing layer on the conductive layer.

2. The semiconductor acceleration sensor according to claim 1, wherein the conductive layer is formed of Cr.

3. The semiconductor acceleration sensor according to claim 1, wherein the insulating layer is formed of $SiO_2$.

4. The semiconductor acceleration sensor according to one of claims 1 to 3, wherein the conductive layer is connected to ground so that an influence of electrostatic capacity generated between the central board and the outside board which are opposed to each other via the sealing insulating section is avoided.

5. A method of manufacturing a semiconductor acceleration sensor which comprises a central board having a movable electrode section, an outside board having a stationary electrode section and a sealing insulating section having a conductive layer, wherein the central board, the outside board, and the sealing insulating section are laminated and joined on each other, comprising the step of: laminating the central board on the outside board and subjecting the central board and the outside board to an anodic-bonding, wherein the conductive layer is used as an anodic-bonding electrode.

6. The method of manufacturing a semiconductor acceleration sensor according to claim 5, wherein electric potential of the central board is the same as that of the outside board.

7. The method of manufacturing a semiconductor acceleration sensor according to claim 5, wherein the conductive layer is formed of Cr.

\* \* \* \* \*

UNITED STATES PATENT AND TRADEMARK OFFICE
CERTIFICATE OF CORRECTION

PATENT NO. : 6,153,917  
DATED : November 28, 2000  
INVENTOR(S) : Matsunaga et al.

Page 1 of 1

It is certified that error appears in the above-identified patent and that said Letters Patent is hereby corrected as shown below:

<u>Title page,</u>  
ABSTRACT, line 7, change "sealing" to -- shielding --.

Signed and Sealed this

Ninth Day of April, 2002

*Attest:*

*Attesting Officer*

JAMES E. ROGAN  
*Director of the United States Patent and Trademark Office*